United States Patent
Kimura et al.

(10) Patent No.: US 9,412,405 B2
(45) Date of Patent: Aug. 9, 2016

(54) PATTERN FORMING METHOD AND MANUFACTURING METHOD OF MAGNETIC RECORDING MEDIUM

(71) Applicant: Kabushiki Kaisha Toshiba, Minato-ku (JP)

(72) Inventors: Kaori Kimura, Yokohama (JP); Akira Fujimoto, Kawasaki (JP); Akira Watanabe, Kawasaki (JP)

(73) Assignee: KABUSHIKI KAISHA TOSHIBA, Mintao-ku (JP)

( * ) Notice: Subject to any disclaimer, the term of this patent is extended or adjusted under 35 U.S.C. 154(b) by 0 days.

(21) Appl. No.: 14/455,058

(22) Filed: Aug. 8, 2014

(65) Prior Publication Data
US 2015/0310885 A1    Oct. 29, 2015

(30) Foreign Application Priority Data
Apr. 25, 2014    (JP) ................... 2014-092072

(51) Int. Cl.
   *G11B 5/84*      (2006.01)
   *G11B 5/855*     (2006.01)

(52) U.S. Cl.
   CPC ....................... *G11B 5/855* (2013.01)

(58) Field of Classification Search
   CPC .... G11B 5/855; G11B 5/3116; G11B 5/3163; G11B 5/72
   See application file for complete search history.

(56) References Cited

U.S. PATENT DOCUMENTS

| | | | | |
|---|---|---|---|---|
| 8,465,855 B2 * | 6/2013 | Bradshaw | ............. | G11B 5/712 252/62.51 R |
| 8,995,089 B2 * | 3/2015 | Takizawa | ................ | G11B 5/72 360/135 |
| 2006/0068231 A1 | 3/2006 | Hattori | | |
| 2007/0116989 A1 | 5/2007 | Ikekame et al. | | |
| 2010/0183866 A1 | 7/2010 | Fujimoto et al. | | |
| 2012/0300339 A1 | 11/2012 | Osaka et al. | | |

(Continued)

FOREIGN PATENT DOCUMENTS

| | | |
|---|---|---|
| JP | 2006-82182 | 3/2006 |
| JP | 2006-107550 | 4/2006 |

(Continued)

OTHER PUBLICATIONS

U.S. Appl. No. 14,164,593, filed Jan. 27, 2014, Kaori Kimura et al.

(Continued)

*Primary Examiner* — Duy Deo
*Assistant Examiner* — Mahmoud Dahimene
(74) *Attorney, Agent, or Firm* — Oblon, McClelland, Maier & Neustadt, L.L.P.

(57) ABSTRACT

According to one embodiment, disclosed is a pattern forming method including preparing a second dispersion by adding a second protective group and second solvent to fine particles including a first protective group whose surface polarity is close to that of the substrate, the fine particles containing, at least on the surface thereof, a material selected from Al, Ti, V, Cr, Mn, Fe, Co, Ni, Zn, Y, Zr, Sn, Mo, Ta, W, Au, Ag, Pd, Cu, Pt, and an oxide thereof, modifying the fine particles including the first protective group with the second protective group, adding a viscosity adjustment agent to the dispersion containing the fine particles to prepare a coating solution, and applying the coating solution on the substrate to form a fine particle layer thereon.

30 Claims, 7 Drawing Sheets

(56) References Cited

U.S. PATENT DOCUMENTS

| | | |
|---|---|---|
| 2014/0287265 A1 | 9/2014 | Kimura et al. |
| 2015/0069013 A1 | 3/2015 | Kimura et al. |

FOREIGN PATENT DOCUMENTS

| | | |
|---|---|---|
| JP | 2006-342399 | 12/2006 |
| JP | 2007-69272 | 3/2007 |
| JP | 2007-149155 | 6/2007 |
| JP | 4068578 | 3/2008 |
| JP | 2010-170726 | 8/2010 |
| JP | 2011-12165 | 1/2011 |
| JP | 2012-243379 | 12/2012 |
| JP | 2013-187499 | 9/2013 |
| JP | 2014-186776 | 10/2014 |
| JP | 2015-56186 | 3/2015 |

OTHER PUBLICATIONS

U.S. Appl. No. 14,327,927, filed Jul. 7, 2014, Kaori Kimura et al.
Sankar K Sivaraman et al. "Realization of thermally durable close-packed 2D gold nanoparticle arrays using self-assembly and plasma etching", Nanotechnology 23, 2012, 14 pages.
U.S. Appl. No. 14,152,249, filed Jan. 10, 2014, Kimura et al.
U.S. Appl. No. 14,197,674, filed Mar. 5, 2014, Kimura et al.

\* cited by examiner

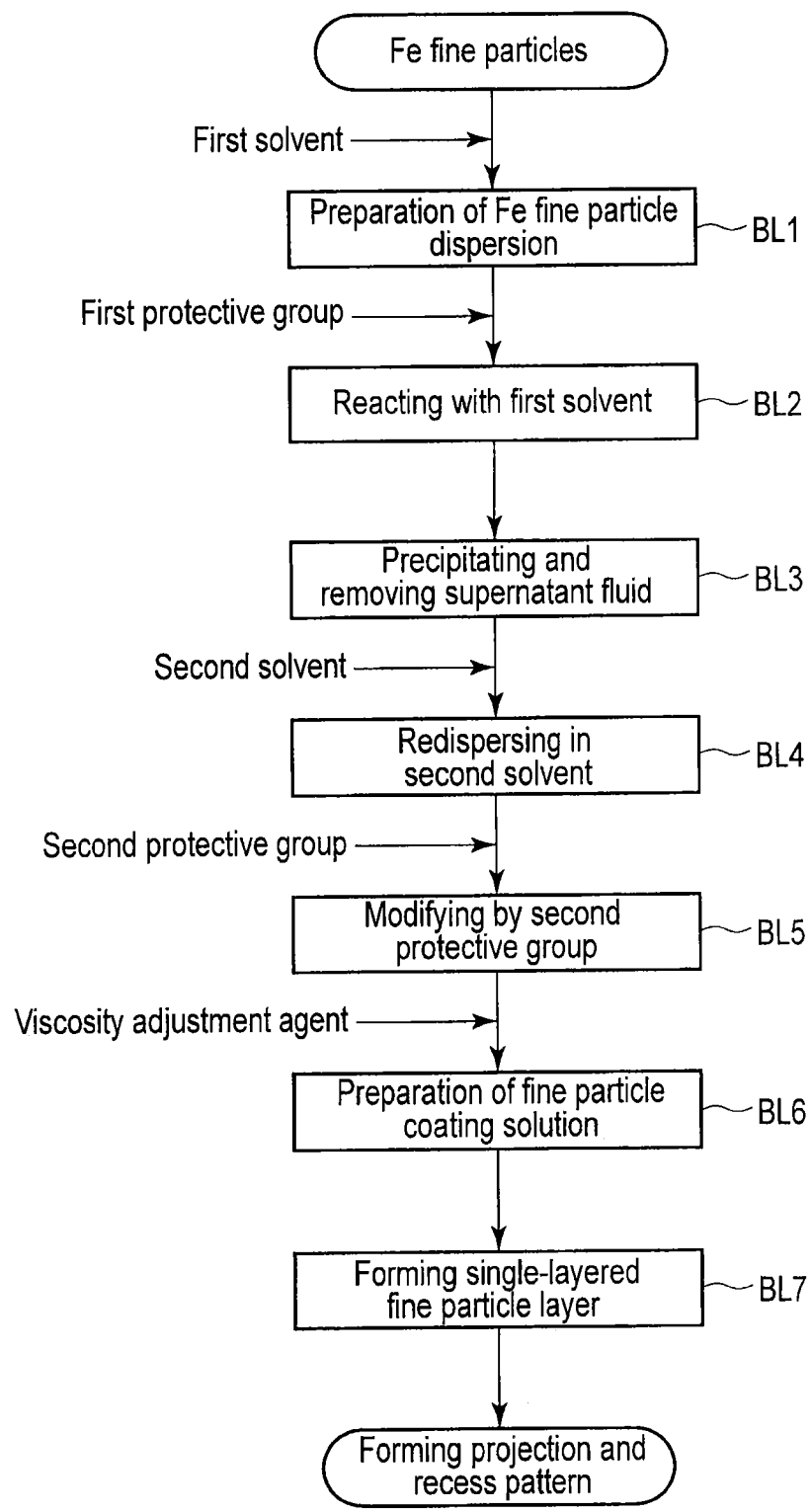
F I G. 4

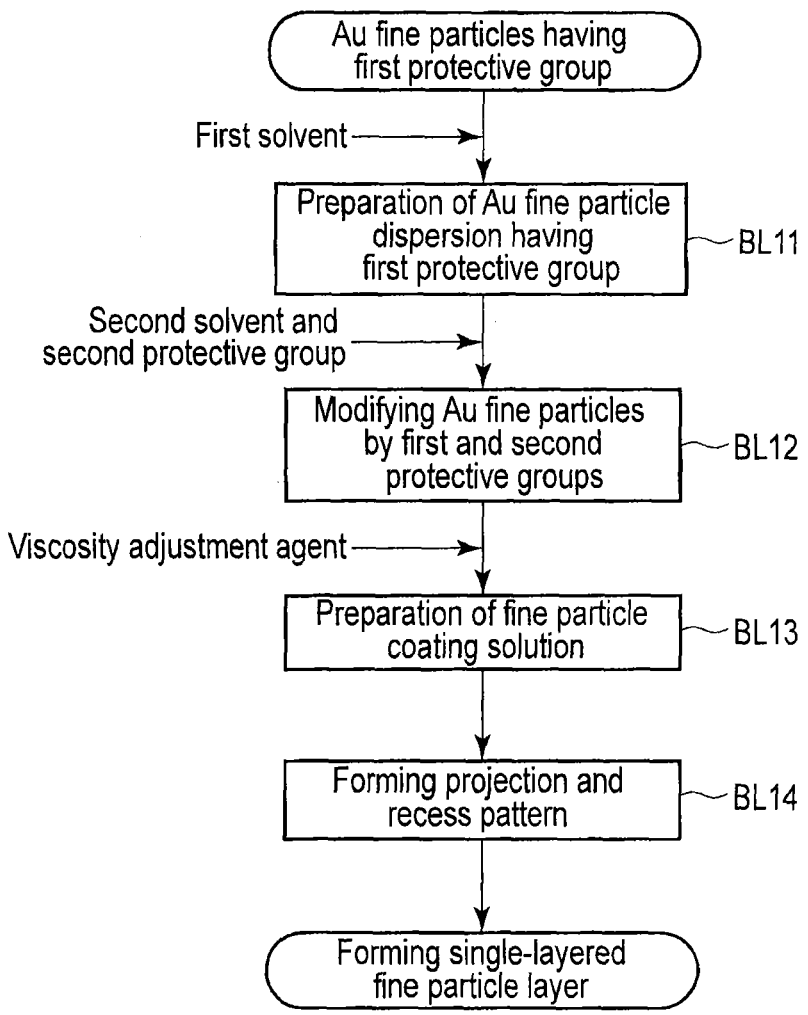
F I G. 6

ПАTTERN FORMING METHOD AND MANUFACTURING METHOD OF MAGNETIC RECORDING MEDIUM

CROSS-REFERENCE TO RELATED APPLICATIONS

This application is based upon and claims the benefit of priority from Japanese Patent Application No. 2014-092072, filed Apr. 25, 2014, the entire contents of which are incorporated herein by reference.

FIELD

Embodiments described herein relate generally to a pattern forming method and a manufacturing method of magnetic recording medium.

BACKGROUND

Microstructures regularly arranged with intervals of several nanometers to several hundreds of nanometers are applicable to various techniques such as a catalyst, antireflective film, electric circuit, and magnetic recording medium. As methods for manufacturing such microstructures, there are, for example, a pattern drawing method in which patterns are drawn on a resist by electron-beam and ultraviolet light drawing devices, and a method using a self-organization phenomenon occurring in diblock copolymers or fine particles.

Especially, when the fine particles are used, an advantage which is unobtainable from a pattern formation using diblock copolymers or a resist can be achieved. Inorganic fine particles have their etching resistance different from that of organic materials and thus, if a material is chosen properly for the fine particles, the etching selection ratio and growth selection ratio in subsequent processes can be improved.

However, conventional microstructure-related techniques face a difficulty in patterning the fine particles formed of any desired material on a substrate in a single-layered arrangement with certain intervals. When the fine particles are arranged regularly, a viscosity adjustment agent of high viscosity must be mixed in the fine particles. However, if fine particles of, for example, Fe are used, the particles therein aggregate by such a viscosity adjustment agent at the time of the mixture and the aggregation renders the application of fine particles difficult in the first place. Moreover, although polystyrenes can be substituted for the periphery of Au particles as a protective group, such a structure is difficult to be formed in a close-packed arrangement by spin coating.

BRIEF DESCRIPTION OF THE DRAWINGS

FIG. 4 is a flowchart of an example of a forming method of the periodic pattern used in the first embodiment.

FIG. 6 is a flowchart of another example of the forming method of the periodic pattern used in the first embodiment.

DETAILED DESCRIPTION

Figure 1:
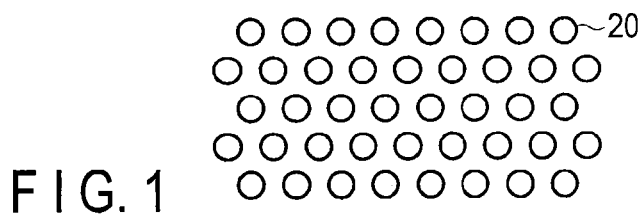
FIG. 1 shows an example of a periodic pattern formable by methods of the embodiments.

According to the first embodiment, provided is a manufacturing method of a magnetic recording medium, the method comprising preparing a second dispersion on a substrate by adding a second protective group and a second solvent to fine particles including a first protective group whose surface polarity is close to that of the substrate, the fine particles containing, at least on the surface thereof, a material selected from a group consisting of aluminum, titan, vanadium, chrome, manganese, iron, cobalt, nickel, zinc, yttrium, zirconium, tin, molybdenum, tantalum, tungsten, gold, silver, palladium, copper, platinum, and an oxide thereof;

preparing a second dispersion by mixing the fine particles with a second protective group and a second solvent;

modifying the fine particles including the first protective group with the second protective group in the second dispersion to form the fine particles including the first and second protective groups;

adding a viscosity adjustment agent into the dispersion including the fine particles including the first and second protective groups to prepare a fine particle coating solution;

applying the fine particle coating solution onto the substrate to form a single-layered fine particle layer on the substrate and a periodic pattern structured by the fine particles; and forming a magnetic recording layer on the periodic pattern.

In the first embodiment, the first protective group having a good affinity for the substrate is provided around the fine particles, the second protective group is further added to the fine particles including the first protective group, the fine particles are dispersed in the solvent mixed with the viscosity adjustment agent having a desired viscosity, and the single-layered fine particle layer in which the applied fine particles are arranged in a periodic pattern without aggregation. Thereby, a patterned medium with lower particle size distribution can be obtained. Furthermore, the second protective group which is added in the latter step can exist not only in the surface of the fine particles but also in the dispersion as being dispersed therein, and thus, the second protective group is packed in the substrate surface and between the fine particles. Consequently, the intermolecular force can act evenly between the fine particles and the arrangement can be improved.

Here, the substrate is a layer to which the fine particle coating solution is applied, and the substrate can be formed as a single layer or a multilayer as occasion demands.

According to the second embodiment, provided is a manufacturing method of a magnetic recording medium, the method comprising: preparing a second dispersion on a substrate including a magnetic recording layer by mixing a second protective group and a second solvent, the fine particles including a first protective group having a surface polarity similar to that of the substrate, and the fine particles including, at least on their surfaces, a material selected from a group consisting of aluminum, titan, vanadium, chrome, manganese, iron, cobalt, nickel, zinc, yttrium, zirconium, tin, molybdenum, and tantalum, with tungsten, gold, silver, palladium, copper, and platinum, and oxide thereof, the method comprising the following steps of:

preparing a second dispersion by mixing the fine particles with a second protective group and a second solvent;

modifying the fine particles including the first protective group with the second protective group in the second dispersion to form the fine particles including the first and second protective groups;

adding a viscosity adjustment agent into the dispersion including the fine particles including the first and second protective groups to prepare a fine particle coating solution;

applying the fine particle coating solution onto the substrate to form a single-layered fine particle layer on the substrate; and transferring the periodic pattern of the fine particle layer to the magnetic recording layer.

According to the second embodiment, the single-layered fine particle layer in which the fine particles are arranged in a periodic pattern is formed, the periodic pattern including the fine particles which do not aggregate. Thereby, a patterned medium with lower size distribution of magnetic grains can be obtained.

Here, the periodic pattern is a pattern arranged with certain regularity. The pattern may be of asperities, or may be of materials with different chemical compositions, or may be of a combination thereof; that is, materials with different chemical compositions in asperities. For example, if the fine particles of Fe are embedded in a polymethylmethacrylate matrix for the arrangement, the pattern arrangement is formed of the materials with different chemical compositions without asperities. Furthermore, if the polymethylmethacrylate matrix is removed by the RIE process, only the fine particles of Fe reside in the projection and recess pattern. The certain regularity means that the arrangement is in either one of the projection and recess pattern or in the pattern of the materials with different chemical compositions. The arrangement may be the hexagonal close-packed arrangement or the square arrangement. In the arrangement, a hundred or more patterns are included therein at least. A region with a regular arrangement is referred to as a domain, and the fine particle arrangement in the present embodiment may include a plurality of domains. The arrangement will be disordered at a boundary between the domains.

The magnetic grains are in a region where the magnetic substance induces the magnetization inversion as a single domain in the magnetic recording layer. For example, the magnetic grains have a regular structure. The regular structure may be a monocrystalline structure, or an alternately laminated film such as $L1_0$ structure, or an artificial lattice having the same surface orientation. Furthermore, considering a structure in which magnetic grains such as granular mediums are embedded in a non-magnetic matrix, such magnetic substances in the matrix correspond to the magnetic grains in the present application. The particle size distribution of the magnetic grains is directly linked to jitter noises at the time of resume. Thus, a medium with smaller particle size distribution is ideal. In the present application, the magnetic recording layer is separated using the periodic pattern of the fine particles, and the particle size distribution of fine particles is substantially the same as that of the magnetic grains.

Moreover, the substrate is a layer to which the fine particle coating solution is applied, and the substrate can be formed as a single layer or a multilayer as occasion demands.

In the present embodiment, the first protective group having a good affinity for the substrate is provided around the fine particles, the second protective group is further added to the fine particles including the first protective group, the fine particles are dispersed in the solvent mixed with the viscosity adjustment agent having a desired viscosity, and the fine particle layer in which the applied fine particles are arranged is formed. At that time, the solubility of the solvent, protective groups, and viscosity adjustment agent is adjusted for better mixture of the viscosity adjustment agent and the protective groups, and although it may not be closest-packed arrangement depending on the application condition, the fine particles can be arranged with certain regularity. Furthermore, the second protective group which is added in the latter step can exist not only in the surfaces of the fine particles but also in the dispersion as being dispersed, and thus, the second protective group is packed in the substrate surface and between the fine particles so that the intermolecular force can act evenly between the fine particles and the arrangement can be improved.

Moreover, such fine particles are applicable to a device having a nano-structure including a patterned medium in which the fine particles are arranged in a high-density close-packed manner on a substrate. Or, such fine particles will be used as a template for such a nano-structure. What must be considered during the single layer arrangement of the fine particles on the substrate are the applicability and the adherence between the fine particles and the substrate. If the adherence is too strong, the fine particles alone adhere to the substrate and the arrangement is not achieved. On the other hand, if the adherence is too weak, the fine particles do not reside on the substrate. In the embodiments, the first protective group whose surface polarity is similar to that of the substrate is provided around the fine particles for obtaining the single layer application. Furthermore, the viscosity adjustment agent of high viscosity is mixed in the fine particle dispersion for obtaining a regular arrangement of the fine particles. The particles having diameters of 10 nm or less are arranged by this method to be used as a template of the magnetic recording medium.

According to the third embodiment, provided is a pattern forming method, comprising preparing a dispersion on a substrate by mixing fine particles with a second protective group and a second solvent, the fine particles including a first protective group having a surface polarity similar to that of the substrate, the fine particles including, at least on the surface thereof, a material selected from a group consisting of aluminum, titan, vanadium, chrome, manganese, iron, cobalt, nickel, zinc, yttrium, zirconium, tin, molybdenum, and tantalum, with tungsten, gold, silver, palladium, copper, and platinum, and oxide thereof;

modifying the fine particles including the first protective group with the second protective group in the dispersion to form the fine particles including the first and second protective groups;

adding a viscosity adjustment agent into the dispersion including the fine particles including the first and second protective groups to prepare a fine particle coating solution; and applying the fine particle coating solution onto the substrate to form a fine particle layer on the substrate.

According to the pattern forming method of the third embodiment, a periodic pattern in which fine particles are arranged without aggregation can be obtained. The second protective group is packed in the substrate surface and between the fine particles so that the intermolecular force can act evenly between the fine particles and the arrangement can be improved.

Here, the substrate is a layer on whose surface the fine particle coating solution is applied, and includes a layer by which the periodic pattern is formed eventually with the fine particles, a layer to be processed into the periodic pattern, or a combination of a layer eventually processed into the periodic pattern and a layer to be removed.

<Particles>

Fine particles used in the examples range in size from 1 nm to 1 μm. When being used in a magnetic recording medium, the size of particle including a protective group is set 20 nm or less. Particles are spherical in many cases, but may be tetrahedral, rectangular parallelepiped, octahedral, triangular prismatic, hexagon prismatic, or cylindrical.

Considering the regularity in the arrangement, such shapes possess high symmetry. In order to improve the arrangement quality at the time of the application, the fine particles should have low size dispersion. For example, the size dispersion may be maintained 20% or less, or may be further reduced to 15% or less. When the size dispersion decreases, jitter noises in a HDD medium can be reduced. When the size dispersion exceeds 20%, a merit from lowering the size dispersion is not special as compared to a conventional medium manufactured by sputtering.

A material for the fine particles may be a metal, inorganic substance, or a compound of a metal and an inorganic substance. Specifically, the material may be Al, Ti, V, Cr, Mn, Fe, Co, Ni, Zn, Y, Zr, Sn, Mo, Ta, W, Au, Ag, Pd, Cu, and Pt. Furthermore, an oxide, nitride, boride, carbide, and sulfide of these elements may be used. The fine particles may be crystalline or amorphous. Core shell type particles formed of, for example, Fe surrounded by $SiO_x$ (x=1 to 1.5) may be used. When core shell type particles are used, they may be formed of a combination of different compositions such as $Fe_3O_4$ surrounded by $SiO_2$. Furthermore, metal core shell type particles such as Co/Fe may be used and the surface thereof may be oxidized to be a structure of three or more layers such as $Co/Fe/FeO_x$. As long as the main constituent is selected from the above elements, a compound with a rare metal such as Pt and Ag can be used and such a compound is, for example, $Fe_{50}Pt_{50}$.

The arrangement of the fine particles is conducted in a solution system, and thus, the fine particles are dispersed in a solution stably with the below-described protective group.

<Protective Group>

Materials used for first and second protective groups are, for example, organic substances with a reactive functional group such as carboxy group or thiol group at their terminal.

Generally, a carboxy group reacts well with particles of Al, Si, Ti, V, Cr, Mn, Fe, Co, Ni, Zn, Y, Zr, Sn, Mo, Ta, and W, and a thiol group reacts well with particles of Au, Ag, Pd, Cu, and Pt. If the particles are formed of an alloy of two particle materials, the protective groups may be formed of a substance with the group reactive with the particle material contained more. If the particles are formed of a material with substantially equal composition ratio such as $Fe_{50}Pt_{50}$, both groups can be used at the same time. In that case, the carboxy group will react with the Fe side and the thiol group will react with the Pt side.

The reactive functional groups of the first and second protective groups are coupled to the fine particles to use their main chains for interparticle range adjustment, and polarity adjustment for the arrangement. Generally, the polarity is well expressed in terms of a solution parameter (SP value). The SP value is greater with a material having large polarity such as water and is lesser with a material having small polarity. In the present application, a surface of carbon (C) or silicon (Si) is mainly used, and in such a surface, the SP value should preferably be 25 $MPa^{1/2}$ or less. The main chain of the organic substance may be formed of general hydrocarbons ($C_nH_{2n+1}$), hydrocarbons including one or more double bonds or triple bonds, aromatic hydrocarbons including polystyrene, polyesters, or polyethers. As saturated hydrocarbons having the carboxy group, there are, for example, capric acid, lauric acid, palmitinic acid, and stearic acid. As unsaturated hydrocarbons having the carboxy group, there are, for example, palmitoleic acid, oleic acid, linoleic acid, and linolenic acid. As hydrocarbons having the thiol group, there are, for example, $C_nH_{2n+1}$-thiol or $C_nH_{2n}$-thiol. The main chain may be formed of a polymer such as polyester, polyethylene, epoxy, polyurethane, polystyrene, and polypropylene. For the process to have the second protective group react later, a straight chain structure with fewer branches can be obtained from such polymers. Especially, the SP value of polystyrenes is close to that of the application solvent and thus, they are good in solubility and applicability.

The first and second protective group may be formed of at least one selected from a group consisting of saturated hydrocarbon, unsaturated hydrocarbon having two or more carbon double bonds, polyester, polystyrene, polymethyl methacrylate, polyallyl ether, polyvinyl ether, polyester acrylate, polyester methacrylate, and a derivative thereof.

If the second protective group is added rather more, the flowability with respect to the substrate can be increased and the arrangement of the particles can be improved. The reactive functional group of the second protective group may/may not react with the surface of the substrate during/after the application. If the reactive functional group reacts with the surface, it means that the surface of the substrate is modified by the second protective group, and the particles can be adhered on the surface more easily. If the reactive functional group does not react with the surface, it means that the second protective group exists between the particles in a free state, and functions to fill the part where the first protective group is short for supporting the particle arrangement.

Note that the first protective group and the second protective group may be either the same or different.

The main chain of the first protective group can be the same as that of the second protective group.

<Solvent>

The fine particles are dispersed in first and second solvents, and the first and second solvents may be selected from those have high affinity to the first and second protective groups, respectively. Furthermore, considering the application process, the solvents may be organic solvents, not aqueous solvents. A solvent which dissolves metallic particles, that is, hydrochloric acid or the like should not be used. When the application is performed by spin coating or the like, the volatility of the solvent used should be high, and the boiling point may be set to 200° C. or less, or may be further reduced to 160° C. or less. As the solvent, there are, for example, aromatic hydrocarbon, alcohol, ester, ether, ketone, glycol ether, alicyclic hydrocarbon, and aliphatic hydrocarbon. Specifically, considering both the boiling point and the applicability, hexane, toluene, xylene, cyclohexane, cyclohexanone, propylene glycol 1-monomethyl ether 2-acetate (PGMEA), diglyme, ethyl lactate, methyl lactate, and THF are used, for example.

Note that the first solvent and the second solvent may be either the same or different.

<Reaction Between Protective Groups and Fine Particles>

The fine particles can react with the first or second protective group, respectively, in the solvent system. There are a method in which the fine particles and the first or second protective group are dispersed separately first and then they are mixed, and a method in which the one is powdered and the other is dispersed in a solvent and then they are mixed. When the both are separately dissolved in the solvents, a difference between the SP values can be maintained within 5, and the same solvent can be used. After the mixture, a reaction time for a few minutes to for a few hours is taken to bring a complete reaction between the fine particles and the first or second protective group. To carry out the reaction sufficiently, the first and second protective groups must be mixed in the concentration higher than that fully covers the periphery of the fine particles. For example, if the fine particles of Fe having a diameter of 8 nm are prepared, polystyrene molecules 50 to 2000 times more than the Fe atoms therein are mixed. At that time, there are the fine particles with the first and/or second protective groups and the free first and/or second protective groups having no reaction to the fine particles in the solvent. In some cases, a protective group generated at the particle mixture, namely, oleylamine or the like may be included therein. In order to control the amount of the first and second protective groups in the solvent, the fine particles coupled with the first protective group may be precipitated in a poor solvent to dispose a supernatant fluid including the non-reactive first protective group. Then, the second protective group of a desired amount is added anew therein.

The number of the protective groups coupled to the fine particle controls the arrangement. The number of the protective groups is determined based on how many reactive functional groups (carboxy group, thiol group, and the like) of the protective groups there are with respect to the surface area of the fine particles. If the size of the fine particles is approximately 10 nm, the number of the protective groups will be 0.1 to 100/nm². Considering a protective group molecule having one functional group reactive to the fine particle surface, the number of the protective group per surface area can be calculated as follows.

Total surface area of fine particles: $S$=Surface area per particle×Number of fine particles=Surface area per particle×(Total weight of fine particles/Weight per particle)=$4\pi r^2 \times m_{NP}/(d \times (4\pi r^3/3))$ Number of protective group molecules: $N$=Total weight of protective groups/Weight per protective group molecule=$m_L/M_W \times N_A$ Here, $m_{NP}$ is the total weight of the fine particles, $m_L$ is the total weight of the protective groups, $r$ is a radius of a fine particle, $d$ is a density of the material of the fine particles, $M_W$ is a molecular weight of the protective groups, and $N_A$ is Avogadro's number.

When the number of the protective groups is insufficient, intervals between particles do not become even, and thus the arrangement is disordered. When the number of the protective groups is too excessive, interaction between particles does not work and intervals between particles become too wide, and thus the arrangement does not occur. In commercially available fine particles, such a suitably excessive amount of the protective group does not exist and the arrangement is difficult.

<How to Apply the Fine Particles>

Methods such as a spin coating method, dip coating method, and LB method are used for applying fine particles to a substrate. In the spin coating method, a fine particle dispersion whose concentration has been adjusted is dropped onto the substrate, and the substrate is spun for drying a solvent from the fine particle dispersion. The film thickness is adjusted by the number of revolutions. In the dip coating method, a substrate is dipped into a dispersion and withdrawn therefrom. While the substrate is being withdrawn, the viscosity and intermolecular force work on the substrate, and fine particles are adhered onto the substrate by the viscosity and intermolecular force. The film thickness is adjusted by the speed of the withdrawal operation. In the LB method, the polarity of protective groups and the polarity of a solvent are dissociated to have single-layered fine particle float upon the surface of a substrate, and then, the substrate is dipped in and withdrawn from a dispersion. Hence, the fine particles are arranged on the substrate.

<Viscosity Adjustment Agent>

For the regular arrangement of fine particles, a high viscosity substance is mixed into a fine particle dispersion. The viscosity of the substance can be measured by a capillary viscometer or a rotational viscometer. The viscosity required for the viscosity adjustment agent is, although it varies depending on the concentration of the fine particles and the viscosity of the solvent, generally from 10 to 5,000 cps. Below 10 cps, the viscosity is insufficient for the interaction between the particles, and a regular arrangement of fine particles tends to be unobtainable. Above 5,000 cps, uniform application of fluid tends to be difficult.

Here, for disposing the viscosity adjustment agent uniformly between the fine particles, the molecular weight thereof should not be so high. Specifically, the molecular weight thereof may be from 100 to 1,000.

The viscosity adjustment agent may possess the polymerization for the fixed particle arrangement. For example, an acryloyl group, methacryloyl group, epoxy group, oxetane ring, vinyl ether group, and a polymeric material having any other unsaturated bond may be used in the viscosity adjustment agent. With such groups, the polymerization between the protective groups is promoted by light and heat, and the protective groups are further cured.

Note that the polymeric material can be used in an uncured state as long as a desired viscosity is obtained thereby.

As a resin material whose viscosity is from 100 to 1000 cps, there are, for example, acrylates, methacrylates, and their derivatives.

The acrylates are, for example, ethyl acrylate, isobornyl acrylate, phenyl acrylate, octyl acrylate, tripropylene glycol diacrylate, trimethylolpropane ethoxytri acrylate, pentaerythritol triacrylate, epoxy acrylate, urethane acrylate, polyester acrylate, and polyether acrylate. The mathacrylates are, for example, methoxypolyethylene glycol methacrylate, phenoxyethylene glycol methacrylate, stearyl methacrylate, ethylene glycol dimethacrylate, triethylene glycol dimethacrylate, polyethylene glycol methacrylate, ethoxylation bisphenol A diacrylate, propylene glycol diacrylate, trimethylolpropane trimethacrylate, polyester methacrylate, polyether methacrylate, epoxy methacrylate, and urethane methacrylate.

The polymeric material having an epoxy group may be, for example, epoxy acrylate, epoxy ethane, alchol glycidyl ether, ethylene glycol glycidyl ether, and polyethylene glycol glycidyl ether.

The polymeric material having an oxetane ring may be, for example, 3-ethyl-3-hydroxymethyloxetane and 3-ethyl-chloromethyloxetane.

The polymeric material having a vinyl ether group may be, for example, 2-hydroxyethylvinyl ether, diethylene glycol monovinyl ether, and 4-hydroxybuthyl vinyl ether.

The arrangement of the fine particles is disordered by the Brownian movement, and it becomes worse as the viscosity decreases. Thus, the curing of the viscosity adjustment agent becomes more important as the viscosity becomes lower. For example, if the viscosity adjustment agent in its undiluted form has 1,000 cps or less, the curing should be performed.

In order to mix the viscosity adjustment agent with the fine particles uniformly, the SP value of the viscosity adjustment agent should not be so high. However, when the functional groups of polymerization increase, the SP value tends to increase alongside. If the SP value is less than 18 $(MPa)^{1/2}$, the groups required for the polymerization tend to lower. If the SP value is greater than 25 $(MPa)^{1/2}$, the applicability to the substrate tends to deteriorate.

<How to Cure Viscosity Adjustment Agent>

The polymeric resin packed in the periphery of the fine particles can be cured by irradiating general UV light thereon. The UV light is light having wavelengths of 200 to 400 nm. If, for example, phenol denatured acrylate is used as a polymeric resin, it is cured by irradiating UV light from an UV ramp of 10 to 100 $mW/cm^2$ for several tens of seconds. If a radical polymerization mechanism is used for the curing, oxygen will block the curing effect, and thus, an oxygen-free condition such as vacuum or protective film covered condition should be used for preventing oxygen from flowing in.

Furthermore, the protective group can be cured alongside the polymeric resin by heating. For example, when a material such as isobutyl acrylate is used, the protective group can be cured by being heated at 150° C. for 30 minutes to a few hours in an $N_2$ atmosphere oven.

<Hard Mask>

A hard mask layer can be provided between the fine particle layer and the substrate layer, if necessary. The height of the mask is secured by the hard mask layer, and the pattern is tapered.

A hard mask is disposed on a recording layer by, for example, sputtering and the hard mask includes one or more films. If a certain degree of height is required, the hard mask layer can be composed of two or more layers. For example, a hard mask layer composed of an underlayer of C and an upperlayer of Si can possess a high aspect ratio. If the underlayer is formed of a metal such as Ta, Ti, Mo, W or a compound thereof, the upperlayer may be formed of a material such as Ni or Cr. If a metallic material is used as a mask, the film forming rate can be accelerated.

When used in an ion milling process, the hard mask layer is formed of a material such as C, Ta, Ti or a compound thereof. When the hard mask layer is used as a pattern layer on which a magnetic film is deposited, the surface thereof is formed of a material such as Al, Fe, Ni, or Sn which forms an oxide coating film, or a oxidation-resistive rare metal such as Au, Ag, Pt, or Ru, or a material such as C or Si.

<Patterning of Hard Mask>

A dry etching process for patterning the hard mask can be changed variously as occasion demands. For example, if the hard mask is formed of C, dry etching is performed with an oxygen gas such as $O_2$ or $O_3$, or other gas such as $H_2$ or $N_2$. If the hard mask is formed of a material such as Si, Ta, Ti, Mo, or W, the RIE is performed with a halogen gas ($CF_4$, $CF_4/O_2$, $CHF_3$, $SF_6$, and $Cl_2$). If the hard mask is formed of a compound of Cr and Al, the RIE is performed with a Cl gas. If the hard mask is formed of a rare metal such as Pt, Pd, and Cu, ion milling with a rare gas is effective.

<Patterning of Magnetic Recording Layer>

The unmasked part on the magnetic recording layer is wholly etched by the ion milling or RIE to prepare an projection and recess pattern on the recording layer. The projection and recess pattern preparation generally means that the entire materials on the recording layer are etched. In some cases, the materials are partially left in the recesses on the layer, or a first layer is etched entirely while the other layers are left as in a so-called capped structure.

The ion milling is performed with a rare gas such as Ne, Ar, Kr, and Xe, and an inert gas such as $N_2$. If the RIE is performed, $Cl_2$ gas, $CH_3OH$, and $NH_3+CO$ are used. The RIE sometimes requires $H_2$ gas scrubbing, baking, and washing after the etching process.

<Packing>

After the periodic pattern is formed, an additional process to flatten out the periodic pattern by packing may be performed. Packing is performed in many cases by a sputtering method targeted for a packing material because of its simplicity, but may be performed by other methods such as plating, ion beam vapor deposition, CVD, and ALD. If the CVD and ALD are used, a film can be formed on side walls of a highly tapered magnetic recording layer at high rate. Furthermore, when the substrate is biased at the time of forming a packing film, a pattern with the high aspect ratio can be packed without gaps. A so-called resist such as spin-on-glass (SOG) and spin-on-carbon (SOC) may be applied on the pattern by spin coating and cured by thermal processing for packing.

The packing material is not limited to $SiO_2$, and any optional materials can be used as long as they satisfy the hardness and flatness requirements. For example, amorphous metals such as NiTa and NiNbTi are easily flattened out and ideal for the packing material. Materials whose main constituent is C, namely, $CN_x$ and $CH_x$ have high hardness and thus, when they are used, the adherence to diamond-like-carbon (DLC) tends to improve. Oxides and nitrides such as $SiO_2$, $SiN_x$, $TiO_x$, and $TaO_x$ may be used as packing materials. Note that, if a material forms a reactive product during the contact with the magnetic recording layer, a protective layer may be interposed between the packing layer and the magnetic recording layer.

<Protective Film and Lubricant>

The protective layer can be formed of carbon, for example. The carbon protective film should preferably be formed by the CVD method for better asperity coverage, but may be formed by a sputtering method or vacuum vapor deposition method instead. The CVD method can form a DLC film containing a large amount of $sp^3$ coupling carbon. If the film thickness is less than 2 nm, the asperity coverage becomes worse, and if the film thickness is greater than 10 nm, a magnetic space between a record/resume head and a medium increases and the signal-to-noise ratio tends to decrease.

Furthermore, a lubricant can be applied on the protective film. The lubricant is, for example, perfluoropolyether, alcohol fluoride, or fluorinated carboxylic acid.

<Magnetic Recording Layer>

If the magnetic recording layer is formed of an alloy material, its main constituent will be Co, Fe, or Ni and it may contain Pt or Pd. The magnetic recording layer can contain Cr or an oxide, if necessary. Especially, silicon oxide and titanium oxide are available for the oxide. In addition to such an oxide, one or more elements selected from a group consisting Ru, Mn, B, Ta, Cu, and Pd may be contained therein. Such elements improve the crystallinity and orientation and the medium can achieve record/resume performance and thermal fluctuation performance better suit for high-density recording.

A perpendicular magnetic recording layer may be formed of CoPt alloy, FePt alloy, CoCrPt alloy, FePtCr alloy, CoPtO, FePtO, CoPtCrO, FePtCrO, CoPtSi, and FePtSi, or a multilayer structure of an alloy whose main constituent is at least one selected from a group consisting of Pt, Pd, Ag, and Cu with Co, Fe, and Ni. Here, an alloy such as MnAl alloy, SmCo alloy, FeNbB alloy, and CrPt alloy having high Ku can be used. Furthermore, an amorphous recording material such as Gd—Co, Gd—Fe, Tb—Fe, Gd—Tb—Fe, Tb—Co, Tb—Fe—Co, Nd—Dy—Fe—Co, or Sm—Co can be used.

The thickness of the perpendicular recording layer is 3 to 30 nm, and may be further limited to 5 to 15 nm. Within this range, a magnetic recording/resuming device better suit for the high-density recording can be manufactured. If the thickness of the perpendicular recording layer is less than 3 nm, resume power is insufficient and noise components are too excessive. If the thickness of the perpendicular recording layer is greater than 30 nm, resume power is too excessive and waveforms are distorted.

<Soft Magnetic Underlying Layer>

A soft magnetic underlying layer (SUL) functions as a part of a magnetic head which passes a recording magnetic field from a single magnetic head horizontally for the magnetization of the perpendicular magnetic recording layer and returns the recording magnetic field to the magnetic head side. The soft magnetic underlying layer applies a steep and sufficient perpendicular magnetic field to the recording layer to improve the record/resume efficiency.

The soft magnetic underlying layer may be formed of a material containing Fe, Ni, or Co. As such a material, there are, for example, FeCo alloy such as FeCo and FeCoV, FeNi alloy such as FeNi, FeNiMo, FeNiCr, FeNiSi, FeAl alloy, FeSi alloy such as FeAl, FeAlSi, FeAlSiCr, FeAlSiTiRu, FeAlO, FeTa alloy such as FeTa, FeTaC, FeTaN, and FeZr alloy such as FeZrN. In addition, such a material may be a microcrystalline structure containing Fe of 60 at % or more such as FeAlO, FeMgO, FeTaN, and FeZrN or a material including a granular structure in which microcrystal particles are dispersed in a matrix. Furthermore, such a material may be a Co alloy containing Co and at least one of Zr, Hf, Nb, Ta, Ti and Y. The Co alloy contains Co of 80 at % or more. When a film containing such a Co alloy is formed by the sputtering method, an amorphous layer can be formed easily. Amorphous soft magnetic materials do not possess crystal magnetic anisotropy, crystal defection, or grain boundary. Thus, such materials indicate very excellent soft magnetization which is advantageous for the purpose of noise reduction in a medium. The amorphous soft magnetic materials may be, for example, CoZr, CoZrNb, and CoZrTa alloy.

An additional underlying layer may be formed under the soft magnetic underlying layer for better crystallization thereof or for better adherence between the soft magnetic underlying layer and the substrate. The additional underlying layer may be formed of, for example, Ti, Ta, W, Cr, and Pt, an alloy containing the same, or an oxide or nitride of the same.

The soft magnetic underlying layer can be divided into a plurality of layers for preventing spike noises, and Ru layers having a thickness of 0.5 to 1.5 nm may be inserted between the divided layers as interlayers for an antiferromagnetic coupling. Otherwise, an exchange coupling may be established between a hard magnetic film having in-plane anisotropy such as CoCrPt, SmCo, and FePt or a pin layer formed of an antiferromagnetic substance such as IrMn or PtMn and a soft magnetic layer. For controlling an exchange coupling force, the Ru layer may be sandwiched by magnetic films (of Co, for example) or nonmagnetic film (of Pt, for example).

<Interlayer>

An interlayer formed of a nonmagnetic substance can be inserted between the soft magnetic underlying layer and the perpendicular magnetic recording layer. The interlayer performs two functions: blocking the exchange coupling interaction between the soft magnetic underlying layer and the recording layer; and controlling the crystallization of the recording layer. The interlayer may be formed of, for example, Ru, Pt, Pd, W, Ti, Ta, Cr, Si, Ni, Mg, an alloy containing the same, or an oxide or nitride of the same.

FIG. 1 shows an example of a periodic pattern prepared by the methods of the embodiments.

As shown, the methods of the embodiments can form a periodic pattern in which fine particles 20 are collectively arranged on a large area in a hexagonal close-packing manner with pitches of a few nanometers to a few tens of nanometers.

Figure 2:
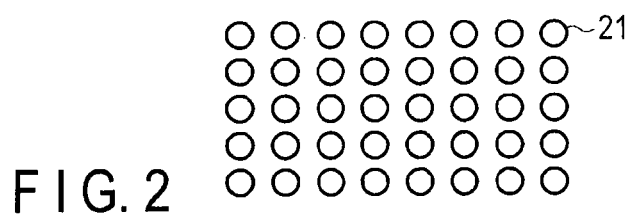
FIG. 2 shows another example of the periodic pattern formable by the methods of the embodiments.

FIG. 2 shows another example of a periodic pattern prepared by the methods of the embodiments.

In this example, a periodic pattern is formed with fine particles 21 in a square arrangement. Such a periodic pattern appears when, for example, the fine particles are in a cubic shape which is not shown.

Figure 3:
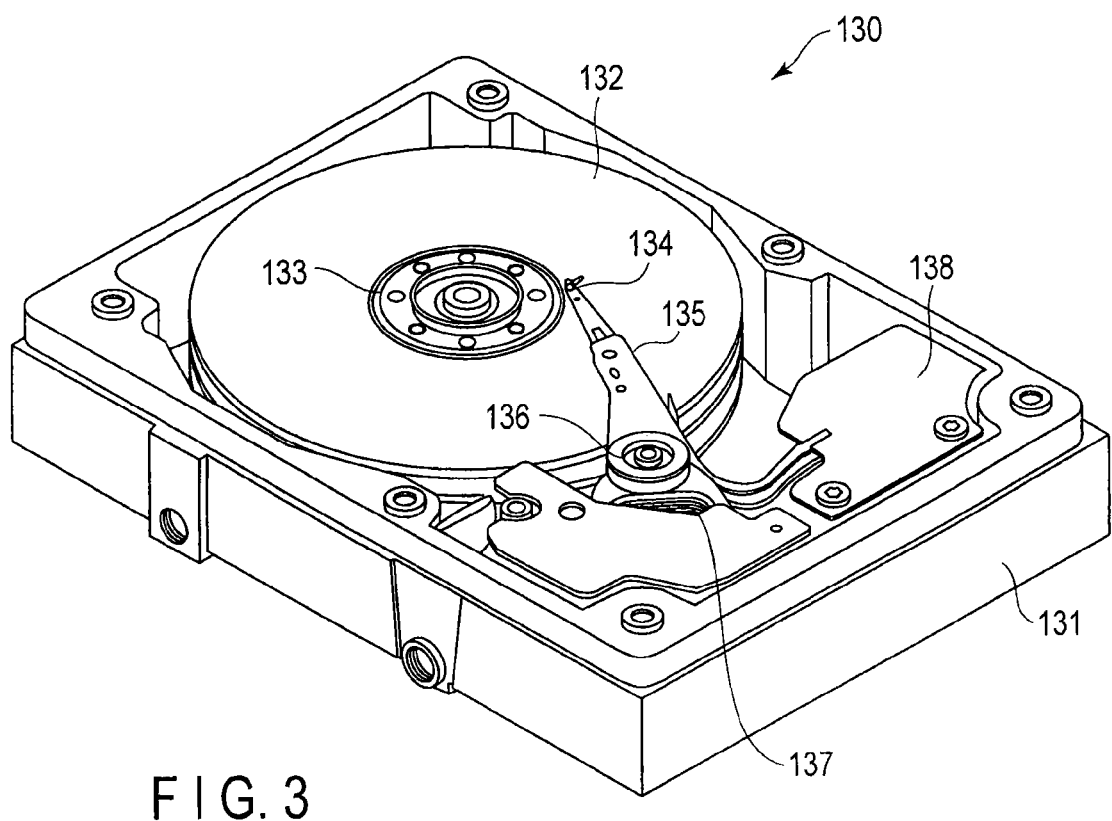
FIG. 3 is a perspective view showing an example of a magnetic recording/resuming device to which a magnetic recording medium of the embodiments is applicable, the device shown in a partially disassembled manner.

FIG. 3 is a perspective view showing an example of a magnetic recording/resuming device to which the magnetic recording medium of the embodiments is applicable in a partially disassembled manner.

As shown in FIG. 3, a magnetic recording/resuming device 130 includes a rectangular box-like casing 131 whose upper surface is open, and a top cover (which is not shown) screwed on the casing 131 by a plurality of screws to cover the upper open surface.

The casing 131 stores, for instance, the magnetic recording medium 132 of the embodiments, a spindle motor 133 used as a driver configured to support and drive the magnetic recording medium 132, a magnetic head 134 configured to record/resume magnetic signals in/from the magnetic recording medium 132, a head actuator 135 having a suspension including the magnetic head 134 at its tip and configured to support the magnetic head 134 to be movable with respect to the magnetic recording medium 132, an axis of rotation 136 configured to support the head actuator 135 rotatably, a voice coil motor 137 configured to rotate and position the head actuator 135 through the axis of rotation 136, and a head amplifier circuit substrate 138.

Hereinafter, examples are presented for explaining the embodiments more specifically.

EXAMPLE 1-1

Based on FIGS. 4 and 5, explained is an example of a manufacturing method of a magnetic recording medium of the first embodiment.

FIG. 4 is a flowchart indicating an example of how the periodic pattern used in the first embodiment is formed.

In the first place, toluene was prepared as a first solvent. Fine particles of Fe (whose particle size is 6 nm) with oleylamine protective groups were dispersed in the first solvent at 0.1 wt % (BL1).

Then, polystyrene (having molecular weight of 2000) having carboxy group terminal was dispersed in a toluene solvent at 5 wt % as a first protective group. This solvent and the Fe fine particle dispersion were mixed in the ratio of 1:1 by weight and stirred for one hour in an argon atmosphere. Thereby, the carboxy group reacted with the surfaces of Fe fine particles, and the oleylamine protective group was substituted by the first protective group (BL2). This reaction led to the oxidization of 2 to 3 nm external surface of the Fe fine particles. This was confirmed by a transmission electron microscope (TEM) observation. The thickness grew by the oxidization, and the diameter of the Fe fine particles changed into 10 nm.

Then, the fine particles were precipitated by centrifugation (at 9000 rpm for 10 minutes) and the supernatant fluid containing the original protective group of oleylamine and nonreactive polystyrene was removed (BL3). Through this process, the fine particles were not in a dispersed state, and the Fe fine particles covered with the first protective group (polystyrene protective group) alone were left.

Next, the Fe fine particles covered with the first protective group were again dispersed in a second solvent of PGMEA (BL4). As a second protective group, carboxy group terminated polystyrene (having molecular weight of 2000) were dispersed in a second solvent (PGMEA) at 5 wt %, and a tenth of the amount of the first protective group was added to the Fe fine particle solvent to modify the Fe fine particles by the first and second protective groups (BL5).

The fine particle dispersion obtained above was diluted to 1 wt % by the PGMEA for the concentration adjustment.

Next, ethoxylated (6) trimethylolpropane triacrylate (hereinafter referred to as E6TAPA) used as a viscosity adjustment agent was added to the fine particles in the ratio of 1:1 by weight for preparing a fine particle layer application liquid (BL6).

The fine particle layer application liquid was dropped onto the substrate, the substrate then was spun at 3000 rpm for spin coating, and a single-layered fine particle layer was formed (BL7).

Here, the substrate 30 of Example 1 is composed of a glass substrate 1, a soft magnetic layer 11 (CoZrNb) whose thickness is 40 nm, and a soft magnetic layer protective layer 12 (NiTa) whose thickness is 5 nm.

Through a scanning electron microscope (SEM) observation, it was confirmed that the fine particles were arranged on the substrate in a single-layer form and in a periodic pattern.

FIGS. 5A to 5D are schematically cross-sectional views showing the steps of forming a patterned magnetic recording medium using the periodic pattern.

Figure 5A:
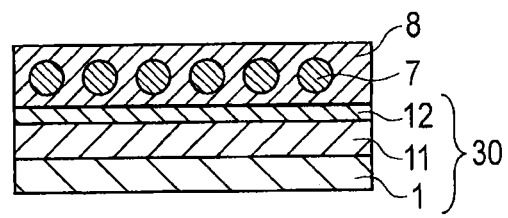
FIGS. 5A, 5B, 5C, and 5D are schematically cross-sectional views showing steps of forming the magnetic recording medium of the first embodiment.

In FIG. 5A, the periodic pattern composed of a fine particle layer 7 and protective group 8 is formed on the soft magnetic layer 11 and soft magnetic layer protective layer (NiTa) 12.

Figure 5B:
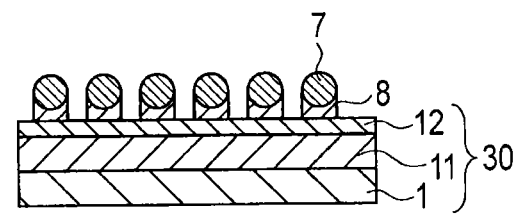

Then, as in FIG. 5B, the protective group 8 around the Fe fine particles 7 was etched by dry etching to isolate particles. This etching process is conducted in, for example, an induction coupling plasma (ICP) RIE device with process gas of $O_2$ gas, chamber pressure of 0.1 Pa, coil RF power of 100 W, platen RF power of 10 W, and etching time of 10 seconds. Since $O_2$ plasma has almost no etching effect to the Fe fine particles 7, the etching process exposes the Fe fine particles 7 on the substrate surface. The etching process is continued until at least the upper half of the particle is exposed.

Figure 5C:
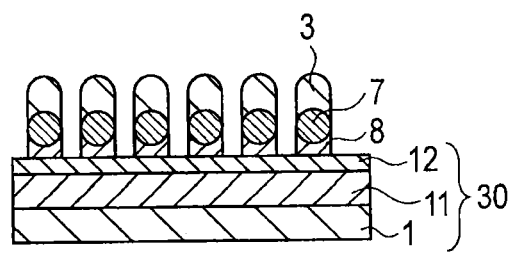

Then, as in FIG. 5C, a magnetic recording layer 3 was deposited on the surface of the Fe fine particles 7 by sputtering. A Ru layer (which is not shown) whose thickness is 3 nm was prepared first for the crystal orientation control. Then, an artificial lattice magnetic recording layer 3 composed of 10 layered [Co(0.3 nm)/Pt(0.7 nm)] (having the total thickness of 10 nm) was stacked on the Ru layer.

Figure 5D:
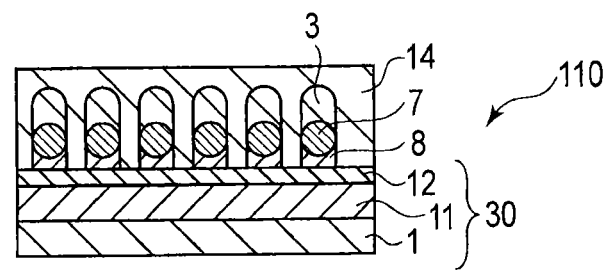

Lastly, as in FIG. 5D, a protective film 14 whose thickness is 5 nm was formed by the chemical vapor deposition (CVD) and a lubricant (which is not shown) was applied thereon to obtain the patterned medium of the first embodiment.

Through the SEM, the planar structure of the patterned medium prepared by the above method was observed. It showed that the size distribution of the [Co/Pt] artificial lattice grains was 10%. From this result, it was confirmed that a magnetic recording medium 110 having low size distribution could be obtained from the micro periodic pattern of the present embodiments.

The obtained magnetic recording medium was loaded in a drive, and recording frequency of 200 MHz was supplied to the medium for the observation of the waveforms. It showed sufficient amplitude for a functional magnetic recording medium.

EXAMPLE 1-2

Based on FIGS. 5A to 5D, and 6, explained is another example of a manufacturing method of a magnetic recording medium of the first embodiment. FIG. 6 is a flowchart indicating another example of how the periodic pattern used in the first embodiment is formed.

In the first place, cyclohexanone was prepared as a first solvent. Fine particles of Au (whose particle size is 8 nm) with dodecanethiol protective groups used as a first protective group were dispersed in the first solvent at 5 wt % (BL11). At that time, dodecanethiol was coupled to the surface area of the Au particles at the concentration of one number/$nm^2$.

Next, a second solvent which is, as with the first solvent, based on cyclohexanone was prepared. In the second solvent, thiol group terminated polystyrene (having molecular weight of 2000) used as a second protective group was dispersed at 5 wt %. The second protective group was dispersed at the concentration of one number/$nm^2$ which is the same volume as that of the first protective group. The Au fine particles were modified by the first and second protective groups (BL12).

The fine particle dispersion obtained above was diluted to 3 wt % by cyclohexanone for the concentration adjustment. Furthermore, E6TAPA used as a viscosity adjustment agent was added to the fine particle dispersion in the ratio of 1:1 by weight for preparing a fine particle coating solution (BL13).

The fine particle layer application liquid was dropped onto the substrate, the substrate then was spun at 3000 rpm for spin coating, and a single-layered fine particle layer was formed (BL14).

Note that the substrate of Example 1-2 is structured the same as the substrate 30 of Example 1-1. It is composed of the glass substrate 1, soft magnetic layer 11 (CoZrNb) whose thickness is 40 nm, and soft magnetic layer protective layer 12 (NiTa) whose thickness is 5 nm.

Through the SEM observation, it was confirmed that the fine particles were arranged on the substrate in a single-layer form and in a periodic pattern.

Next, as in Example 1-1, the processes shown in FIGS. 5A to 5D were conducted and the patterned medium of the first embodiment was obtained.

Through the SEM, the planar structure of the patterned medium prepared by the above method was observed. It showed that the size distribution of the [Co/Pt] artificial lattice grains was 10%. From this result, it was confirmed that a magnetic recording medium 110 having low size distribution could be obtained from the micro periodic pattern of the present embodiments.

The obtained magnetic recording medium was loaded in a drive, and a recording frequency of 200 MHz was applied to the medium for the observation of the waveforms. It showed sufficient amplitude for a functional magnetic recording medium.

EXAMPLES 2-1 to 2-6

Fine particles were applied on a substrate in a single-layered form as in Example 1-1 except the following material changes.

The amount of carboxy group terminated polystyrene used as the second protective group was changed as in Table 1 below. Compared with the Fe fine particles, 0.1 to 20 times greater amount of carboxy group terminated polystyrene was added. Note that Example 1 corresponds to Example 2-4 since 5 times greater amount of polystyrene was added to the Fe fine particles in these examples. Table 1 shows the amount of the second protective group, the molecular weight of the protective group per particle surface area which was calculated the amount of the second protective group, and the result of arrangement from the planar SEM observation.

TABLE 1

|  | Fe particle weight/protective group weight | Protective group molecules per particle surface area (number/nm$^2$) | Arrangement |
| --- | --- | --- | --- |
| Example 2-1 | 0.1 | 0.07 | Δ |
| Example 2-2 | 0.2 | 0.14 | ◯ |
| Example 2-3 | 1 | 0.7 | ⊚ |
| Example 2-4 | 5 | 3.5 | ⊚ |
| Example 2-5 | 10 | 70 | ◯ |
| Example 2-6 | 20 | 140 | Δ |

In the table, the results of the arrangement evaluation are given in symbols. The symbol ⊚ means that a single-layered and regular arrangement area including 100 particles or more on average was achieved. The symbol ◯ means that a single-layered and regular arrangement area including 20 particles or more on average was achieved. The symbol Δ means that a single-layered arrangement area was achieved, or slight aggregation was observed. The symbol X means that the aggregation was observed or the arrangement was unformed.

If the amount of the protective group is less than 0.1/nm$^2$, the arrangement tends to be unformed due to the aggregation in the particles. On the other hand, if the amount of the protective group is greater than 100/nm$^2$, the regular arrangement tends to be unformed due to too much protective groups blocking the particle arrangement. In every case within the range from 0.1 to 100/nm$^2$, the regular arrangement of the particles was observed although gaps between particles became wider with the increase of the protective groups.

The above results confirmed that the periodic pattern with better regularity could be achieved with the protective groups in the range from 0.1 to 100/nm$^2$.

EXAMPLES 3-1 to 3-6

Fine particles were applied on a substrate in a single-layered and periodic patterned form as in Example 1-1 except that the first and second protective groups and their molecular weights were changed as in Table 2.

Note that, as a substitute for polystyrene, polymethyl methacrylate was used in the first and/or second protective groups in some examples. After the concentration was adjusted, the fine particles were applied to the substrate and the arrangement and pitch were measured by the planar SEM. The results are shown in Table 2.

TABLE 2

|  | Original protective group material (molecular weight) | Additional protective group material (molecular weight) | Arrangement | Pitch |
| --- | --- | --- | --- | --- |
| Example 1 | PS (2000) | PS (2000) | ⊚ | 13 nm |
| Example 3-1 | PS (1000) | PS (2000) | ⊚ | 12 nm |
| Example 3-2 | PS (5000) | PS (2000) | ⊚ | 14 nm |
| Example 3-3 | PS (10000) | PS (1000) | ◯ | 16 nm |
| Example 3-4 | PMMA (1000) | PMMA (500) | ◯ | 13 nm |
| Example 3-5 | PMMA (1000) | PMMA (2000) | ◯ | 15 nm |
| Example 3-6 | PS (2000) | PMMA (500) | Δ | 13 nm |

In the table, PS is polystyrene, and PMMA is polymethyl methacrylate. The value in the brackets is the molecular weight.

In the table, the symbol ⊚ means that a single-layered and regular arrangement area including 100 particles or more on average was achieved. The symbol ◯ means that a single-layered and regular arrangement area including 20 particles or more on average was achieved. The symbol Δ means that a single-layered arrangement area was achieved, or slight aggregation was observed. The symbol X means that the aggregation was observed or the arrangement was unformed.

The above results showed that, if the amount ratio between the protective groups was set properly, the regular arrangement could be achieved and it was not affected by varying molecular weight of the additional protective group. Furthermore, the above results showed that the same advantage was achievable from an additional protective group other than polystyrene. Even if the different protective groups were used, the regular arrangement was achieved.

The above results confirmed that the periodic pattern could be achieved even if the molecular weight of the additional protective group changed.

EXAMPLES 4-1 to 4-22

Fine particles were applied on a substrate in a single-layered and periodically patterned form as in Example 1-1 except that the fine particle material was changed as in Table 3. Furthermore, the main chain of the protective group was polystyrene while its terminal part reactive to the fine particles was selected to suit to each changed fine particle material.

TABLE 3

|  | Material | Protective group | Diameter | Arrangement |
| --- | --- | --- | --- | --- |
| Example 4-1 | Fe | carboxy group terminal | 10 nm | ⊚ |
| Example 4-2 | AlO$_x$ | carboxy group terminal | 13 nm | ⊚ |
| Example 4-3 | Si | carboxy group terminal | 10 nm | ⊚ |
| Example 4-4 | TiO$_x$ | carboxy group terminal | 25 nm | ⊚ |
| Example 4-5 | VO$_x$ | carboxy group terminal | 10 nm | ◯ |
| Example 4-6 | CrO$_x$ | carboxy group terminal | 20 nm | ◯ |
| Example 4-7 | Mn | carboxy group terminal | 30 nm | ◯ |
| Example 4-8 | Co | carboxy group terminal | 50 nm | ⊚ |
| Example 4-9 | Ni | carboxy group terminal | 10 nm | ◯ |
| Example 4-10 | Zn | carboxy group terminal | 50 nm | ◯ |
| Example 4-11 | YO$_x$ | carboxy group terminal | 50 nm | ◯ |
| Example 4-12 | ZrO$_x$ | carboxy group terminal | 100 nm | ◯ |
| Example 4-13 | Sn | carboxy group terminal | 100 nm | ◯ |
| Example 4-14 | Mo | carboxy group terminal | 100 nm | ◯ |
| Example 4-15 | Ta | carboxy group terminal | 25 nm | ◯ |
| Example 4-16 | WO$_x$ | carboxy group terminal | 100 nm | ◯ |
| Example 4-17 | FePt (Core)/ FeO$_x$ (Shell) | carboxy group terminal | 10 nm | ⊚ |
| Example 4-18 | Au | thiol group terminal | 8 nm | ⊚ |
| Example 4-19 | Ag | thiol group terminal | 5 nm | ⊚ |
| Example 4-20 | Pd | thiol group terminal | 10 nm | ⊚ |
| Example 4-21 | Cu | thiol group terminal | 50 nm | ◯ |
| Example 4-22 | Pt | thiol group terminal | 20 nm | ◯ |

In the table, the symbol ⊚ means that a single-layered and regular arrangement area including 100 particles or more on average was achieved. The symbol ◯ means that a single-layered and regular arrangement area including 20 particles or more on average was achieved. The symbol Δ means that a single-layered arrangement was achieved. The symbol X means that the aggregation was observed or the arrangement was unformed.

The results above confirmed that, in the process to form the regular arrangement with the additional protective group, the same regular arrangement was achievable even if the material of the fine particles was changed. Such a regular arrangement of fine particles is applicable not only to the magnetic recording medium of Example 1 but also to a reflection-resistive film, memory and catalyst, and has many other applications.

EXAMPLE 5

FIGS. 7A to 7D are schematically cross-sectional views showing a modified example of the manufacturing steps of the magnetic recording medium of the first embodiment.

Here, the periodic pattern composed of the fine particles is not formed on the substrate but on a processable underlying layer, and the processable underlying layer is patterned to remove the fine particles.

In the first place, toluene was prepared for the first solvent. Fine particles of Fe (whose particle size is 6 nm) with oleylamine protective groups were dispersed in the first solvent at 0.1 wt %.

Then, polystyrene (having molecular weight of 2000) used as the first protective group having a carboxy group terminal was dispersed in the toluene solvent at 5 wt %. This solvent and the Fe fine particle dispersion were mixed in the ratio of 1:1 by weight and stirred for one hour in an argon atmosphere. Thereby, the carboxy group reacted with the surfaces of Fe fine particles, and the first protective group was substituted by the oleylamine protective group. This reaction led to the oxidization of 2 to 3 nm external surface of the Fe fine particles. This was confirmed by the TEM observation. Because of the thickness growth, the diameter of the Fe fine particles changed into 10 nm.

Then, the fine particles were precipitated by centrifugation (at 9000 rpm for 10 minutes) and the supernatant fluid containing the original protective group of oleylamine and non-reactive polystyrene was removed. Through this process, the fine particles were no longer in a dispersed state, and the Fe fine particles covered with the first protective group (polystyrene protective group) alone were left.

Next, the Fe fine particles covered with the first protective group were again dispersed in a second solvent of PGMEA. As a second protective group, carboxy group terminated polystyrene (having molecular weight of 2000) were dispersed in a second solvent (PGMEA) at 5 wt %, and a tenth of the amount of the first protective group was added to the Fe fine particle solvent to modify the Fe fine particles covered with the first protective group by the second protective group.

The fine particle dispersion obtained above was diluted to 1 wt % by the PGMEA for the concentration adjustment.

Next, E6TAPA used as a viscosity adjustment agent was added to the fine particles in the ratio of 1:1 by weight for preparing a fine particle layer application liquid.

A substrate 40 was prepared as follows. A soft magnetic layer 11 (CoZrNb) whose thickness is 40 nm, a soft magnetic layer protective layer (NiTa) whose thickness is 5 nm (which is not shown), and an asperity-forming process underlying layer 16 (C) whose thickness is 30 nm were stacked in this order on a glass substrate 1. The Fe fine particle dispersion was dropped onto the substrate, the substrate then was spun at 3000 rpm for spin coating, and a single-layered fine particle layer was formed.

Through the SEM observation, it was confirmed that the fine particles were arranged on the substrate in a single-layer form and in a periodic pattern.

Figure 7A:
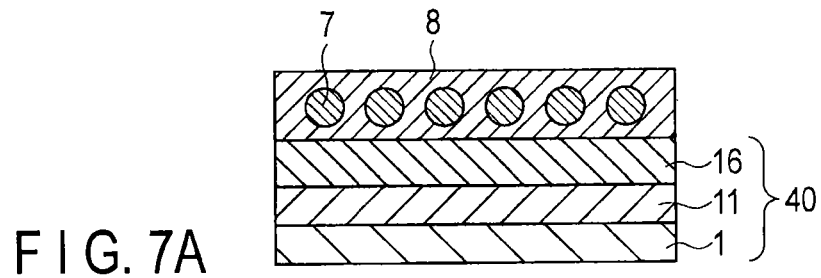
FIGS. 7A, 7B, 7C, and 7D are schematically cross-sectional views showing modified steps of forming the magnetic recording medium of the first embodiment.

FIG. 7A shows the periodic pattern composed of the fine particle layer 7 and the protective layer 8 was formed on the asperity-forming process underlying layer 16.

Figure 7B:
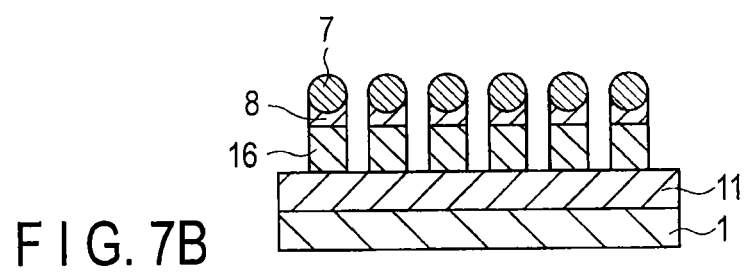

As shown in FIG. 7B, the pattern of the Fe fine particles 7 was transferred to the C underlying layer 16 by dry etching.

This etching process is conducted in, for example, an ICP-RIE device with process gas of $O_2$ gas, a chamber pressure of 0.1 Pa, coil RF power of 100 W, platen RF power of 10 W, etching time of 10 seconds. Since $O_2$ plasma has almost no etching effect to the Fe fine particles 7, the etching process exposes the Fe fine particles 7 on the substrate surface. The etching process is continued until the protective group around the fine particles and C underlying layer are etched and the soft magnetic layer protective layer is exposed.

Figure 7C:
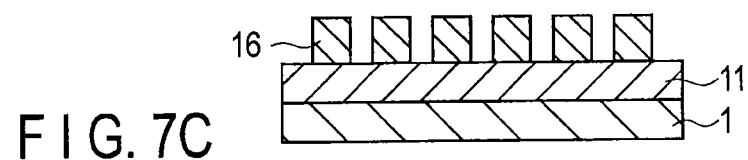

Next, as shown in FIG. 7C, the Fe fine particles 7 were dissolved and peeled to leave C pillars 16 alone. This process is conducted, for example, by immersing the substrate in an HCl solution whose concentration is 1 wt % for 10 minutes to selectively dissolve the Fe fine particles 7. The soft magnetic layer 11 is not dissolved owing to the NiTa protective film.

Figure 7D:
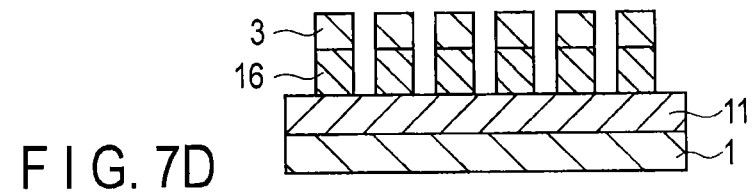

Then, as shown in FIG. 7D, a magnetic recording layer 3 was deposited on the surface of the C pillar 16 by sputtering. The Ru layer of thickness 10 nm was layered first for the crystal orientation control and then, $Co_{80}Pt_{20}$ of thickness 15 nm was layered thereon.

Then, a protective film (which is not shown) of thickness 5 nm was formed by the CVD and a lubricant was applied thereon to obtain the patterned medium of the embodiments.

Through the SEM, the planar structure of the patterned medium prepared by the above method was observed. It showed that the size distribution of the CoPt grains was 10%. From this result, it was confirmed that a magnetic recording medium having low size distribution was achievable.

The obtained magnetic recording medium was loaded in a drive, and recording frequency of 200 MHz was supplied to the medium for the observation of the waveforms. It showed sufficient amplitude for a functional magnetic recording medium.

The above result confirmed that a magnetic recording medium having a periodic pattern of low size distribution and good in-plane uniformity was achievable from the micro pattern of the embodiments.

EXAMPLE 6

FIGS. 8A to 8E are schematically cross-sectional views showing processes of forming a magnetic recording medium of the second embodiment.

A magnetic recording medium was prepared by transferring an projection and recess pattern from Fe fine particles to a magnetic recording layer as follows.

In the first place, a single-layered fine particle layer was formed by applying a fine particle layer application liquid onto a substrate based on the method of Example 1-1.

A substrate 50 was prepared as follows. A soft magnetic layer 2 (CoZrNb) whose thickness is 40 nm, orientation control interlayer 2 (Ru) whose thickness is 20 nm, magnetic recording layer 3 ($Co_{80}Pt_{20}$) whose thickness is 10 nm, protective layer 4 (Pd) whose thickness is 2 nm, and lift-off layer 5 (Mo) whose thickness is 5 nm were stacked on a glass substrate 1.

Figure 8A:
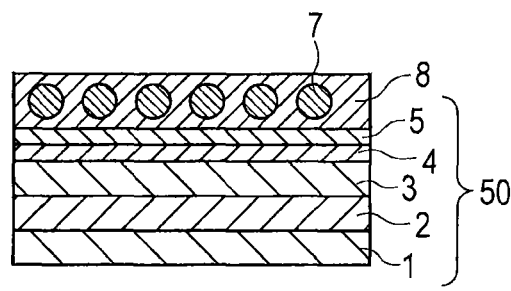
FIGS. 8A, 8B, 8C, 8D, and 8E are schematically cross-sectional views showing steps of forming a magnetic recording medium of the second embodiment.

FIG. 8A shows the periodic pattern composed of the fine particle layer 7 and the protective layer 8 was formed on the lift-off layer 5.

Figure 8B:
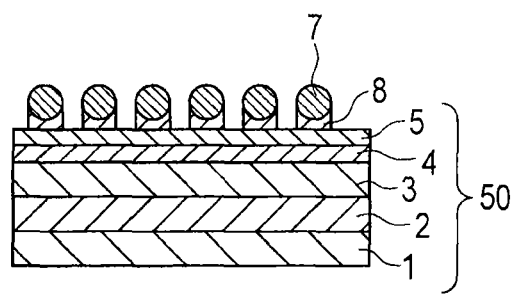

As shown in FIG. 8B, the protective group around Fe was etched by dry etching for exposing the Fe fine particles. This etching process is conducted in, for example, an ICP-RIE device with process gas of $O_2$, a chamber pressure of 0.1 Pa, coil RF power of 100 W, platen RF power of 10 W, etching time of 10 seconds. Since $O_2$ plasma has almost no etching effect to the Fe fine particles 7, the etching process exposes the Fe fine particles 7 on the substrate surface. The etching process is continued until the protective group around the Fe fine particles 7 is etched and the surface of the lift-off layer 5 is exposed.

Figure 8C:
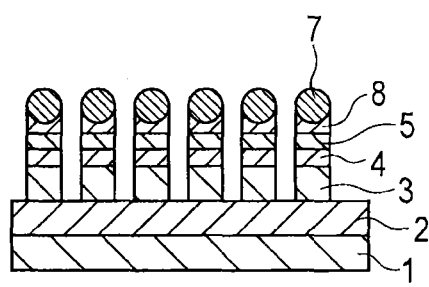

Then, as shown in FIG. 8C, the magnetic recording layer 3 was separated together with the lift-off layer 5 and the protective layer 8 by ion milling using the Fe fine particles 7 as a mask. This ion milling process is conducted in, for example, an Ar ion milling device with process gas of Ar, chamber pressure of 0.04 Pa, plasma power of 400 W, acceleration voltage of 400 V, and etching time of 20 seconds. Through this process, Mo, Pd, and CoPt are milled and the recording layer 3 of CoPt was magnetically divided. The ion milling process is continued until the magnetic recording layer 3 is etched and the surface of the Ru interlayer 2 is exposed.

Figure 8D:
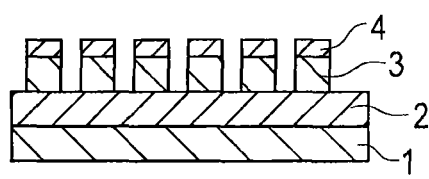

Next, as shown in FIG. 8D, the Fe fine particles 7 were dissolved and peeled. This process is conducted, for example, by immersing the substrate in a hydrogen peroxide solution whose concentration is 1 wt % for 10 minutes. Through this process, the Fe fine particles 7 are dissolved ad peeled together with the Mo lift-off layer 5 and the processed C underlying layer is exposed.

Figure 8E:
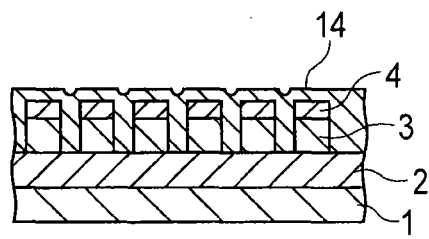

Then, as in FIG. 8E, a second protective film 14 was formed by the CVD and a lubricant (which is not shown) was applied thereon to obtain the patterned medium of the first embodiment.

Through the SEM, the planar structure of the patterned medium prepared by the above method was observed. It showed that the size distribution of the CoPt grains was 10%.

The obtained magnetic recording medium was loaded in a drive, and recording frequency of 200 MHz was supplied to the medium for the observation of the waveforms. It showed sufficient amplitude for a functional magnetic recording medium.

The above result confirmed that a magnetic recording medium possessing low size distribution was achievable from the micro pattern of the embodiments.

EXAMPLE 7

FIGS. 9A to 9E are schematically cross-sectional views showing processes of forming a magnetic recording medium of the second embodiment.

A magnetic recording medium was prepared by transferring an projection and recess pattern from Fe fine particles to a magnetic recording layer through a hard mask layer as follows.

In the first place, a single-layered fine particle layer was formed by applying a fine particle layer application liquid onto a substrate based on the method of Example 1-1.

The substrate 60 was prepared as follows. A soft magnetic layer 2 (CoZrNb) whose thickness is 40 nm, orientation control interlayer 2 (Ru) whose thickness is 20 nm, magnetic recording layer 3 ($Co_{80}Pt_{20}$) whose thickness is 10 nm, protective layer 4 (Pd) whose thickness is 2 nm, lift-off layer 5 (Mo) whose thickness is 5 nm, and hard mask layer 6 (C) were stacked on a glass substrate 1.

Figure 9A:
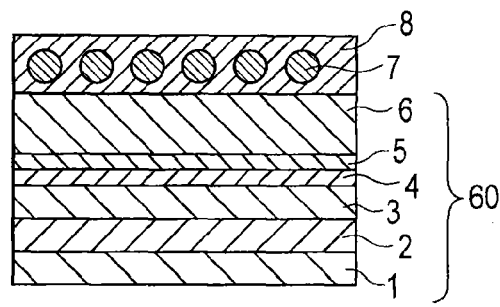
FIGS. 9A, 9B, 9C, 9D, and 9E are schematically cross-sectional views showing another steps of forming the magnetic recording medium of the second embodiment.

FIG. 9A shows the periodic pattern composed of the fine particle layer 7 and the protective layer 8 packed around the fine particle layer 7 was formed on the hard mask layer 6.

Figure 9B:
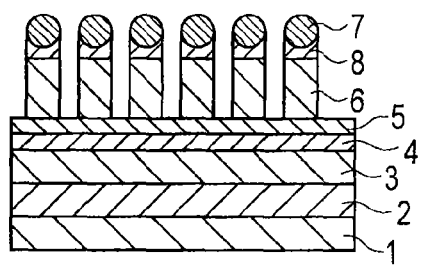

As shown in FIG. 9B, the pattern of Fe fine particle layer 7 was transferred to the C hard mask layer 6 by dry etching. This etching process is conducted in, for example, an ICP-RIE device with process gas of $O_2$, a chamber pressure of 0.1 Pa, coil RF power of 100, platen RF power of 10 W, etching time of 40 seconds. Since $O_2$ plasma has almost no etching effect to the Fe fine particles, the etching process left the mask with Fe particles whose diameter is 10 nm disposed on C pillars whose height is 10 nm.

Figure 9C:
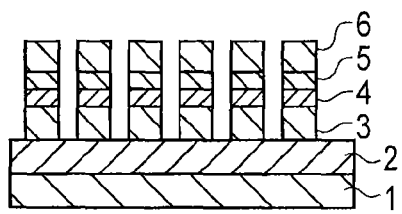

Then, as shown in FIG. 9C, the shape of hard mask layer 6 (C) was transferred to the magnetic recording layer 3 by ion milling. This ion milling process is conducted in, for example, an Ar ion milling device with process gas of Ar, chamber pressure of 0.04 Pa, plasma power of 400 W, acceleration voltage of 400 V, and etching time of 20 seconds. Through this process, Mo lift-off layer 5, Pd protective layer 4, and CoPt magnetic recording layer 3 were etched and the CoPt recording layer 3 was magnetically divided.

Figure 9D:
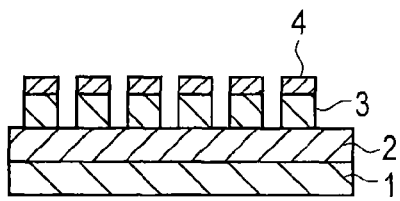

Next, as shown in FIG. 9D, the hard mask layer 6 was peeled off together with the Mo lift-off layer 5. This process is conducted, for example, by immersing the medium in a hydrogen peroxide solution whose concentration is 0.1 wt % for 10 minutes.

Figure 9E:
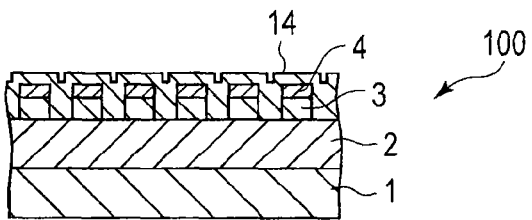

Then, as shown in FIG. 9E, a second protective film 14 was formed by the CVD and a lubricant was applied thereon to obtain the patterned medium 200 of the first embodiment.

Through the SEM, the planar structure of the patterned medium prepared by the above method was observed. It showed that the size distribution of the CoPt grains was 10%.

The obtained magnetic recording medium was loaded in a drive, and recording frequency of 200 MHz was supplied to the medium for the observation of the waveforms. It showed sufficient amplitude for a functional magnetic recording medium.

The above result confirmed that a patterned magnetic recording medium possessing a periodic pattern with low size distribution and good in-plane uniformity was achievable from the periodic pattern of the fine particle layer of the embodiments.

EXAMPLE 8

A carbon nanotube (CNT) was grown using the fine particle arrangement substrate formed by the method of the embodiments.

Firstly, Fe fine particles were arranged on a substrate based on the method of example 1-1 except that the substrate was a silicon substrate with a thermal oxidation film instead of a glass substrate and the fine particles were applied directly on the substrate without forming any underlying layer or the like.

A CNT was grown on the above-structured fine particle arrangement substrate. Before growing the CNT, the RIE using $O_2$ gas was performed to remove a protective group and polystyrene on the surface of the fine particles. The surface of the fine particles was exposed thereby. Then, the CVD using methane gas was performed to grow the CNT on the surface of the fine particles. Through the TEM, the growth of the CNT on the Fe fine particle layer was confirmed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A manufacturing method of a magnetic recording medium, the method comprising:

preparing a second dispersion by adding a second protective group, which is made of an organic substance with a carboxy group or a thiol group, and second solvent to fine particles including a first protective group, which is made of an organic substance with a carboxy group or a thiol group, the fine particles containing, at least on the surface thereof, a material selected from a group consisting of aluminum, titan, vanadium, chrome, manganese, iron, cobalt, nickel, zinc, yttrium, zirconium, tin, molybdenum, tantalum, tungsten, gold, silver, palladium, copper, platinum and an oxide thereof, to modify the fine particles including the first protective group the second protective group in the second dispersion to form the fine particles including the first and second protective groups, the second protective group being dispersed in the second dispersion and packed between the fine particles;

adding a viscosity adjustment agent to the second dispersion to prepare a fine particle coating solution;

applying the fine particle coating solution on a substrate to form a single-layered fine particle layer thereon; and forming a magnetic recording layer on a periodic pattern formed of the single-layered fine particle layer.

2. The manufacturing method of claim 1, further comprising, in advance to forming the magnetic recording layer, performing etching of the first and second protective groups using the fine particles as a mask.

3. The manufacturing method of claim 1, further comprising:
inserting an underlying layer between the substrate and the fine particle layer; and
in advance to forming the magnetic recording layer, transferring the periodic pattern formed of the fine particle layer to the underlying layer using the fine particles as a mask and removing the fine particles.

4. The manufacturing method of claim 1 wherein the second solvent is selected from a group consisting of hexane, 2-butanone, toluene, xylene, cyclohexane, cyclohexanone, PGMEA, diglyme, ethyl lactate, methyl lactate, tetrahydrofuran, and a mixture thereof.

5. The manufacturing method of claim 1, wherein the fine particles including the first protective group are formed by preparing a first dispersion by dispersing the first protective group and the fine particles in a first solvent, and coupling the fine particles with the first protective group in the first dispersion, and
the second dispersion is prepared by precipitating the first dispersion to remove a supernatant fluid and adding the second solvent in which the second protective group is dispersed to the fine particles including the first protective group.

6. The manufacturing method of claim 1, wherein a number of reactive functional groups/a surface area of the fine particles is 0.1 to 100/nm².

7. The manufacturing method of claim 5, wherein the first solvent is selected from a group consisting of hexane, 2-butanone, toluene, xylene, cyclohexane, cyclohexanone, PGMEA, diglyme, ethyl lactate, methyl lactate, tetrahydrofuran, and a mixture thereof.

8. The manufacturing method of claim 1, wherein the first protective group and the second protective group have a same main chain.

9. The manufacturing method of claim 8, wherein the first protective group and the second protective group are the same.

10. The manufacturing method of claim 1, wherein the first and second protective groups contain one of a carboxy group and a thiol group as a reactive functional group.

11. The manufacturing method of claim 10, wherein, when the fine particles contain, at least on the surface thereof, a material selected form group consisting of aluminum, titan, vanadium, chrome, manganese, iron, cobalt, nickel, zinc, yttrium, zirconium, tin, molybdenum, tantalum, tungsten, and an oxide thereof, the reactive functional group of the first and second protective groups is the carboxy group.

12. The manufacturing method of claim 10, wherein, when the fine particles contain, at least on the surface thereof, gold, silver, palladium, copper, platinum, and an oxide thereof, the reactive functional group of the first and second protective groups is the thiol group.

13. The manufacturing method of claim 1, wherein a main chain of the first protective group and the second protective group is at least one selected from a group consisting of saturated hydrocarbon, unsaturated hydrocarbon having a plurality of carbon double binds, polyester, polystyrene, polymethyl methacrylate, polyallyl ether, polyvinyl ether, polyester acrylate, polyester methacrylate and a derivative thereof.

14. The manufacturing method of claim 1, wherein a molecular weight of the first protective group and the second protective group is from 100 to 50,000.

15. The manufacturing method of claim 1, wherein the fine particle coating solution is applied on the substrate by a method selected from spin coating, dip coating, and LB.

16. A manufacturing method of a magnetic recording medium, the method comprising:
preparing a second dispersion including a magnetic recording layer by adding a second protective group, which is made of an organic substance with a carboxy group or a thiol group, and second solve to fine particles including a first protective group, which is made of an organic substance with a carboxy group or a thiol group, the fine particles containing, at least on the surface thereof; a material selected from a group consisting of
aluminum, titan, vanadium, chrome, manganese, iron, cobalt, zinc, yttrium, zirconium, tin, molybdenum, tantalum, tungsten, gold, palladium, copper, platinum, and an oxide thereof,
to modify the fine particles including the first protective group with the second protective group in the second dispersion to form the fine particles including the first and second protective groups, the second protective group being dispersed in the second dispersion and packed between the fine particles;
adding a viscosity adjustment agent to the second dispersion to prepare a fine particle coating solution;
applying the fine particle coating solution on a substrate to form a single-layered fine particle layer thereon; and
transferring a periodic pattern formed of the single-layered fine particle layer to the magnetic recording layer.

17. The manufacturing method of claim 16, when the second solvent is selected from a group consisting of hexane, 2-butanone, toluene, xylene, cyclohexane, cyclohexanone, PGMEA, diglyme, ethyl lactate, methyl lactate, tetrahydrofuran, and a mixture thereof.

18. The manufacturing method of claim 16, wherein the fine particles including the first protective group are formed by preparing a first dispersion by dispersing the first protective group and the fine particles in a first solvent and coupling the fine particles with the first protective group in the first dispersion, and the second dispersion is prepared by precipitating the first dispersion to remove a supernatant fluid, and adding the second solvent in which the second protective group is dispersed to the fine particles including the first protective group.

19. The manufacturing method of claim 16, wherein a number of reactive functional groups/a surface area of the fine particles is 0.1 to 100/nm$^2$.

20. The manufacturing method of claim 18, wherein the first solvent is selected from a group consisting of hexane, 2-butanone, toluene, xylene, cyclohexane, cyclohexanone, PGMEA, diglyme, ethyl lactate, methyl lactate tetrahydrofuran, and a mixture thereof.

21. The manufacturing method of claim 16, wherein the first protective group and the second protective group have a same main chain.

22. The manufacturing method of claim 21, wherein the first protective group and the second protective group are the same.

23. The manufacturing method of claim 16, wherein the first and second protective groups contain one of a carboxy group and a thiol group as a reactive functional group.

24. The manufacturing method of claim 23, wherein, when the fine particles contain, at least on the surface thereof, a material selected form a group consisting of aluminum, titan, vanadium, chrome, manganese, iron, cobalt, nickel, zinc, yttrium, zirconium, tin, molybdenum, tantalum, tungsten, and an oxide thereof, the reactive functional group of the first and second protective groups is the carboxy group.

25. The manufacturing method of claim 23, wherein, when the fine particles contain, at least on the surface thereof, gold, silver, palladium, copper, platinum, and an oxide thereof, the reactive functional group of the first and second protective groups is the thiol group.

26. The manufacturing method of claim 16, wherein a main chain of the first protective group and the second protective group is at least one selected from a group consisting of saturated hydrocarbon, unsaturated hydrocarbon having a plurality of carbon double binds, polyester, polystyrene, polymethyl methacrylate, polyallyl ether, polyvinyl ether, polyester acrylate polyester methacrylate and a derivative thereof.

27. The manufacturing method of claim 16, wherein a molecular weight of the first protective group and the second protective group is from 100 to 50,000.

28. The manufacturing method of claim 16, wherein the fine particle coating solution is applied on the substrate by a method selected from spin coating, dip coating, and LB.

29. A pattern forming method, the method comprising:
preparing a second dispersion by adding a second protective group, which is made of an organic substance with a carboxy group or a thiol group, and second solvent to fine particles including a first protective group, which is made of an organic substance with a carboxy group or a thiol group, the fine particles containing, at least on the surface thereof, a material selected from a group consisting of
aluminum, titan, vanadium, chrome, manganese, iron, cobalt, nickel, zinc, yttrium, zirconium tin, molybdenum, tantalum, tungsten, gold, silver, palladium, copper, platinum, and an oxide thereof,
to modify the fine particles including the first protective group with the second protective group in the second dispersion to form the fine particles including the first and second protective groups, the second protective group being dispersed in the second dispersion and packed between the fine particles;
adding a viscosity adjustment agent to the second dispersion to prepare a fine particle coating solution; and
applying the fine particle coating solution on a substrate to form a fine particle layer thereon.

30. The pattern forming method of claim 29, wherein the fine particles including the first protective group are formed by preparing a first dispersion by dispersing the first protective group and the fine particles in a first solvent; and coupling the fine particles with the first protective group in the first dispersion, and
the second dispersion is prepared by precipitating the first dispersion to remove a supernatant fluid; and adding the second solvent in which the second protective group is dispersed to the fine particles including the first protective group.

* * * * *